Nov. 27, 1962  W. F. GESELL  3,065,628
GAGING APPARATUS WITH CALIBRATING MEANS
Filed June 16, 1961  2 Sheets-Sheet 1

INVENTOR.
William F. Gesell
BY
Edward T. Wei
atty

Nov. 27, 1962    W. F. GESELL    3,065,628
GAGING APPARATUS WITH CALIBRATING MEANS
Filed June 16, 1961    2 Sheets-Sheet 2

INVENTOR.
William F Gesell
BY
Edward T. Noé
atty

United States Patent Office 3,065,628
Patented Nov. 27, 1962

3,065,628
GAGING APPARATUS WITH CALIBRATING MEANS
William F. Gesell, Fairborn, Ohio, assignor to The Sheffield Corporation, Dayton, Ohio, a corporation of Delaware
Filed June 16, 1961, Ser. No. 117,643
10 Claims. (Cl. 73—37.9)

This invention relates to pneumatic control circuits, and more particularly to air gages for determining the size or other characteristic of a product gaged.

Various types of air gaging circuits are employed in industry in the precision measurement of various product characteristics. Such circuits are comparative in nature, comparing the workpiece or part dimension with a reference master. For reliable operation, the gaging circuit must be periodically checked against the reference master and, if necessary, adjusted to obtain the proper reference response.

One type of air gaging circuit to which the principles of the present invention are particularly applicable involves a gaging head connected to a source of regulated air supply with a restriction in the air supply line so that a back pressure is obtained. The amount of the back pressure in the back pressure chamber depends upon the air flow taking place between the gage head and the workpiece gaged, and thus is indicative of the size of the workpiece. Suitable indicating or switching means controlled by the back pressure may be used in the gaging operation to indicate the workpiece size.

The various elements of the gaging circuit are normally adjusted when initially set up so that a predetermined indication is obtained in accordance with the master size. One master may be used at the middle of the scale range, or, if desired, maximum and minimum masters may be employed at the two extremes of an acceptable size range and the maximum and minimum sizes indicated by corresponding references on the indicator.

In spite of the fact that a gage may be properly set up and adjusted, after a period of use it may be found by checking against the master that the indicating reading obtained is not exactly correct and a calibration must be made. This has been accomplished by manually adjusting elements of the gaging circuit and since one adjustment may affect others, this operation has been time consuming and requires the gage to be temporarily taken out of use, often for considerable periods of time.

It is, therefore, one object of the present invention to provide an automatic calibrating means for the pressure sensing means of a pneumatic circuit so the calibration may be quickly and economically effected.

Another object is the provision of a pneumatic control system embodying gaging means that incorporates a back pressure chamber and having a pressure sensitive element automatically controlling a compensating means and controlled in turn by the pressure in the back pressure chamber.

Another object is the provision of a gaging apparatus in which calibration may be provided by an air relief valve connected to the pressure sensing means of the circuit and in which the air relief valve may at times be automatically adjusted in accordance with the pressure in the back pressure chamber when the gage head is engaged with a reference master.

Another object of the invention is a provision of an automatic calibrating mechanism for an air gaging circuit in which there is provision for locking the setting of the compensating device after calibration has been effected.

A further object of the invention is the provision of a calibrating mechanism utilizing a pair of diaphragms of different diameter and arranged to control the setting of an air bleed valve operably connected in the circuit to affect the operation of the pressure sensing means, the diaphragms being arranged for temporary connection to that part of the circuit connected to the pressure sensitive means to automatically calibrate the pressure sensitive means when the gage head is engaged with a reference master.

Further objects and advantages of the invention will be apparent from the following description of several preferred embodiments of the invention described with reference to the accompanying drawings forming part of this specification and in which.

Figure 1:
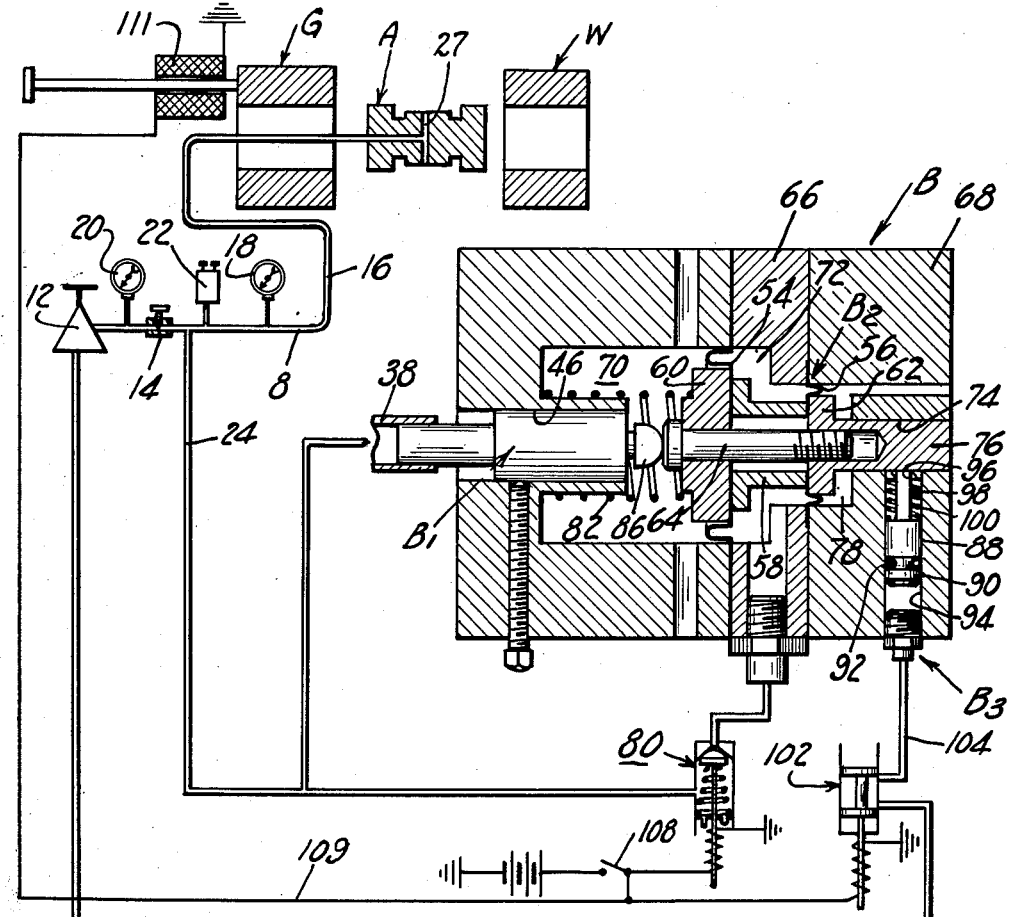
FIG. 1 is a diagrammatic view of a gaging apparatus embodying the present invention with certain portions shown in section for better illustration.

The principles of the present invention have utility in a fluid pressure system in which a control pressure is obtained and varies in accordance with variations in a product characteristic and in which it is desired to periodically adjust or calibrate a pressure sensing means under the control of the control pressure. In accordance with the construction illustrated for exemplary purposes in FIGS. 1 and 2 of the drawing, the invention is shown in its application to a size measuring instrument embodying a pressure regulator 12 adapted for connection to a factory air line or to some other high pressure air source, as indicated at 10. The pressure regulator is connected through a conduit 16 to a gage head "A" which is adapted for cooperation with a reference master "G" and also adapted to be moved into a work part "W" to be gaged. The conduit 16 contains a restrictor 14 so that a back pressure chamber 8 exists between the restrictor and the gage head and the pressure in this back pressure chamber varies with the amount of leakage taking place between the inner wall of the master or workpiece and the outlet nozzles or orifices 27. The pressure in the back pressure chamber controls a pressure sensing means, and for this purpose a pressure gage 18 having a suitable indicating pointer and scale is connected to the back pressure chamber 8. A pressure sensing means such as a pressure responsive switch 22 may also be employed. If desired, the pressure ahead of the restrictor on the downstream side of the pressure regulator may be shown by a pressure gage 20.

I will be understood that in operation the difference in pressure between that which exists in the back pressure circuit and the surrounding atmosphere is sensed and by properly controlling the adjustable restrictor 14 and the pressure from the pressure regulator 12, the graduations on the pressure gage 18 may be made to properly coincide with the size of the workpiece. These adjustments may be made using a maximum and a minmum reference master to set the maximum and minimum points of the scale on the pressure gage, or, if desired, a single master may be used either at the middle of the scale range or at one end of the scale range.

A conduit 24 is connected to the back pressure chamber 8, between the pressure regulator and the gage head and has a connection at 38 to a compensating means illustrated in this embodiment of the invention as a relief or bleed valve $B_1$. This bleed valve is such that normally a small amount of flow takes place so that the variable that is sensed by the pressure gage 18 or the pressure switch 22 is a composite of the small bleed through the bleed valve and the flow through the gage head, but if the flow through the bleed valve is substantially constant, with a proper calibration of the pressure gage 18, it will read in terms of the size of the part being gaged. The air valve $B_1$ is automatically controlled periodically by a pressure sensitive element connected back to the conduit 16 between the gage head and the restrictor so that when the gage head is applied to the reference master, the gage will be automatically calibrated and make the proper adjustment in the opening in the bleed valve $B_1$ to restore normal operation and coordinate the size of the part with the size reading obtained on the pressure gage. Fluid control circuits may be affected so that small changes occur between the times they are calibrated and tend to slowly drift out of calibration by reason of the wear that takes place at the gage head or by reason of a gradual build up of foreign deposits in the circuit or by temperature changes or by drift occurring in the pressure regulator affecting the output pressure. These small effects require calibration from time to time and this calibration may be very readily and quickly accomplished in accordance with the present invention so as to make a quick zero adjustment of the indication obtained on the pressure gage. This calibration may be made at the high end of the scale or at the low end of the scale by using a maximum or a minimum size reference master, or at an intermediate or mid position along the scale where one master is used for setting up the circuit.

Figure 2:
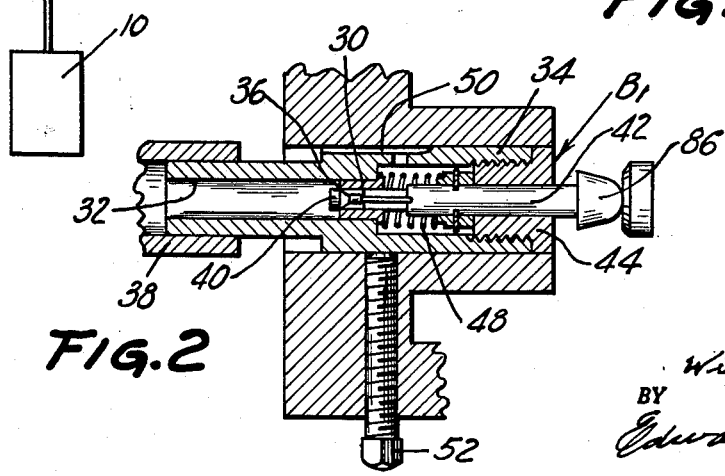
FIG. 2 is an enlarged central sectional view of a portion of the calibrating mechanism illustrating the relief valve construction.

The bleed valve $B_1$, shown more clearly in FIG. 2 of the drawing, may be of any suitable type and, as shown, it corresponds substantially to the construction shown and described in Aller Patent 2,831,257. It comprises an annular valve seat 30 pressed into an axially extending bore 32 and the housing member 34. Communication is established through the conduit 24 so that an air flow takes place through the orifice port 36, depending upon the position of the valve controlling end 40 of the plunger 42 which when fully retracted into the port 36, with an operating clearance within that port, substantially closes communication. Normally, however, the end 40 has a suitable spacing from the end of the valve seat 30 and some flow takes place, exhausing through a relief passage 50 to atmosphere.

The plunger 42 is guided for axial movement in a bushing 44 fixed to the one end of the valve body or housing 34. A coil spring 48 normally urges the plunger 42 towards the right, as reviewed in FIGS. 1 and 2. The housing 34 fits slidably within a circular bore 46 in the body of the compensator "B" and is held in properly adjusted position by means of a set-screw 52.

The end of the plunger 42, which projects from the bushing 44, has an operating head 86 which is controlled by a pressure sensitive element 60, the spring 48 maintaining the head 86 in contact with the pressure sensitive element. Although a single flexible diaphragm may be employed, it is preferred that the pressure sensitive element be arranged in a double diaphragm structure incorporating two rubber impregnated fabric diaphragms 54 and 56 which are clamped by a spacer member 58, element 60 and ring 62 by a through bolt 64 which forms a central hub. The outer periphery of the diaphragm 54 is clamped in sealed relationship to one end of the housing section of the compensator by means of a stepped spacer 66, and the outer periphery of the diaphragm 56 is clamped and sealed between the stepped spacer 66 and an end cover member 68. A large diameter bore 70 is provided in the housing section of the compensator and within this bore is a spring 82 bearing against the pressure sensitive element 60 and normally urging the element 60 towards the right, as viewed in FIG. 1. As indicated, the diaphragm 54, being of larger effective size than the diaphragm 56, causes a force to the left counterbalancing the spring force towards the right when a pressure is applied to the sealed pressure chamber 72 contained between the two diaphragms. The ring 62 has a stem 76 of reduced diameter which is guided for axial movement in a bore 74 contained in the housing section 68 and an air relief passage 78 in the housing section 68 places the right hand side of the diaphragm 56 in communication with the atmosphere. The pressure responsive element 60 is thus arranged for axial movement under the control of the air pressure supplied to the pressure chamber 72 between the diaphragms, and the opposing balancing springs.

The pressure chamber 72 defined by the diaphragms 54 and 56 is connected to a valve 80 operable to establish communication to the conduit 24. While a mechanically operable valve may be employed, it is preferred the valve 80 be controlled electrically through an energizing winding which when energized will open the valve and when the energizing winding is deenergized, the valve will be entirely closed. Thus, a switch 108 may be energized to supply current through the energizing winding and open the valve, placing the back pressure chamber between the gage head and the restriction 14 directly in communication with the pressure chamber 72. This is done at a time when the gage head is within the reference master "G." Under those conditions the precise pressure required to move the indicator of the pressure gage 18 to properly correspond with the size of the master should be assured if there is no drift in the elements of the gaging circuit. Consequently during initial set up of the gage the bleed valve $B_1$ is properly set with relation to the pressure sensitive element 60 that this result will be obtained at a point of balance between the springs 48 and 82 on the one hand and the opposing pressure exerted by the pressure chamber 72 on the other hand. However, if drift should have occurred due to wear of the gage head, due to temperature changes, due to change in the operation of the pressure regulator or for other causes, then at the time the pressure chamber is connected to the conduit 24 a different pressure will be applied to the pressure chamber and the pressure sensitive element 60 will adjust its position to some other point of balance, and in doing so it will adjust the position or the bleed valve $B_1$ in such a way as to restore the pressure conditions that should exist between the restrictor 14 and the gage head. Thus, if the pressure existing in the back pressure chamber 8 of conduit 16 is normally, let us say, 5 pounds per square inch, if the pressure is restored back to its normal value, it will be obvious that the pressure gage will then be indicating the correct size and the circuit will have been recalibrated properly. After such recalibration, the switch 108 is opened, the valve 80 is therefore closed, and the pressure within the pressure chamber is trapped and so has to hold the pressure sensitive element 60 to the position in which it was adjusted. Holding the position of the pressure sensitive element 60 thus holds the position of the relief valve itself.

To avoid the contingency of a possible leak in the pressure chamber 72 at a time when its pressure should be maintained during gaging operation, and to insure the firm setting of the calibration obtained, it is desired to have an additional locking means, either for the valve plunger itself or the pressure sensitive element 60, and as herein shown, this locking means is applied directly to the stem portion 76 of the ring 62. This locking structure generally designated $B_3$ embodies a frictional device 88 which includes a plunger 90 having an O ring 92 on its periphery providing a sealing engagement with a transverse bore 94 in the housing section 68. Extending from the bore 94 is a smaller opening 96 extending through to intersect the longitudinal bore 74 in the housing section 68. The plunger member 90 includes an extension 98 of reduced diameter which is operable through the passage 96 to abut against the stem portion 76 of the hub assembly of the diaphragm mechanism. The plunger 90 is urged out of engagement with the stem 76 by means of a coil spring 100 engaging the head of the plunger 90. Plunger 90 is operable to firmly engage with stem 76 by means of air pressure admitted to the outer face of the plunger 90. This control pressure may come from the conduit 24 but preferably is supplied directly from the high pressure line that supplies the pressure regulator 12. It is supplied through a solenoid operated three-way valve structure 102 which will alternately communicate the line 104 to the atmosphere or to the air supply line. In the embodiment shown, the valve 102 is biased to the position which communicates the high pressure line to the input line 104 and when the solenoid is energized, communication is established between line 104 and atmosphere. As shown, the solenoid of the valve 102 operates to clamp at the same time that the valve 80 closes. The switch 108 may also be effective through a connection 109 to energize a solenoid coil 111 having a solenoid core connected directly to the reference master "G" so as to extend the master towards the right into engagement with the gage head "A" in its normal position at the same time that the valve 80 is opened and the clamp is freed.

In the operation of the construction that has been described, it will be apparent that a recalibration of the gage may be effected practically in an instant merely by closing the switch 108 and then opening it again. Closing of the switch 108 would establish communication between the back pressure chamber 8 and pressure chamber 72 after releasing the lock of the pressure sensitive element 60 and move the reference master into engagement with the gage head. The application of the pressure existing in the back pressure chamber between the gage head and the restrictor 14 would automatically reposition and pressure sensitive element 60 as required, and produce the required adjustment of the air relief valve to restore pressure conditions and have the indicator properly and exactly restored to normal conditions. Opening the switch 108 would immediately close the valve 80, trapping the pressure that had been applied to the pressure sensitive element 60 and also setting the clamp through the valve 102 so as to firmly clamp the pressure sensitive element regardless of any pressure changes that might subsequently tend to affect the pressure that is trapped in the pressure chamber 72. The gage head A may then be used to perform a number of gaging operations, it being understood that the recalibration operations may be made as desired.

Figure 3:
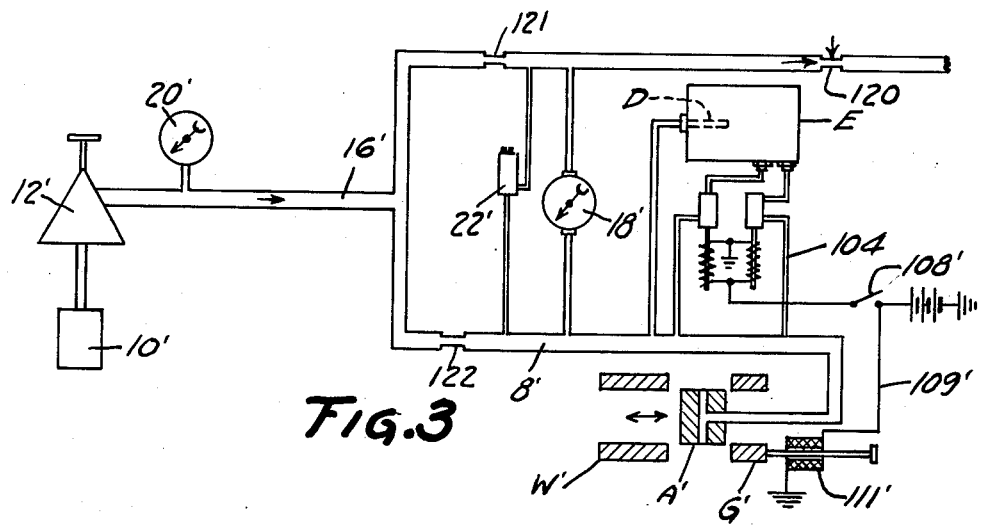
FIG. 3 is a schematic view showing another arrangement of circuitry embodying the present invention and arranged to provide a null signal for parts of a normal size.

In this arrangement the back pressure of a single back pressure circuit is employed in the gaging operation but the invention is also adaptable for use in conjunction with a null type circuit, as illustrated in FIG. 3, where there is a plurality of back pressure circuits, one of which is connected to the gage head A'. The other back pressure circuit is connected to an adjustable orifice 120. Pressure is supplied to the system from a pressure source 10', and pressure regulator 12', to a conduit 16 connected to two parallel back pressure circuits through restrictors 121 and 122. Differentially connected across the two back pressure circuits is a pressure switch 22' and a pressure sensing differential gage 18'. Normally in operation the controllable orifice 120 is so adjusted and set that the flow through it equals the combined flow through the gage head A' and the supplementary bleed that takes place through the bleed valve D connected to the back pressure circuit 8'. This balance of pressure occurs when the work W' being gaged corresponds to the size of the master G' and under these conditions, the indicator 18' will show zero since there will be a balance of pressure across the two equal pressures of the two pressure chambers. If there is a difference in pressure, the indicator, being calibrated in inches, will show the deviation in size from the required size.

It will be understood that in the construction shown in FIG. 3 the compensator E is similar in all respects to the compensator B of FIG. 1. It is similarly controlled electrically by the switch 108' to unlock the locking mechanism which is supplied with air through a conduit 104 connected either directly to the high pressure supply line or as shown connected to the back pressure chamber 8'. Communication is established between the back pressure chamber 8' and the pressure chamber within the compensator E when the switch 108' is closed and at the same time the lead wire 109' is connected to energize the solenoid winding 111' and move the reference master G' towards the left into engagement with the gage head.

In this construction it will be understood that the gage system operates in the same way as in the embodiment shown in FIG. 1 so that the pressure in the back pressure chamber 8' may be occasionally connected to the pressure sensitive element of the calibrator E to automatically adjust the bleed valve D and restore the pressure in the back pressure chamber to a normal condition, thus balancing the pressures in the two back pressure chambers, automatically calibrating the pressure sensing gage 18'.

Figure 4:
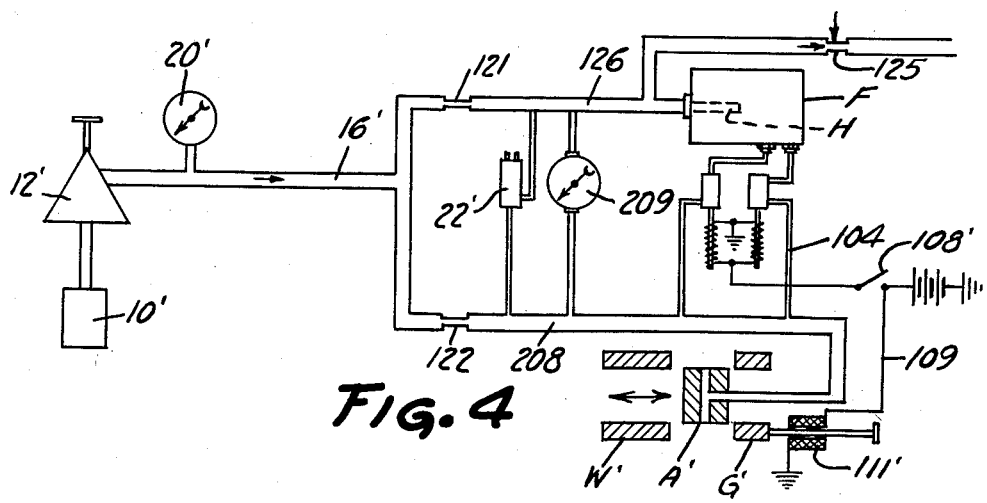
FIG. 4 is a schematic view of another modification of the invention, also employing the null type circuitry.
Figure 5:
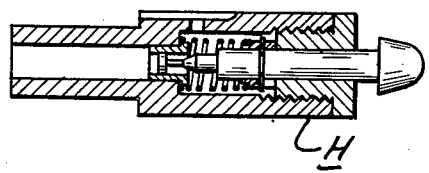
FIG. 5 is a sectional view of the bleed valve employed in the arrangement of FIG. 4.

FIG. 4 shows an embodiment of the invention in which the various parts of the system are similar to the one illustrated in FIG. 3 except that the calibrator F, although similar in all other respects to the calibrator E and B, is provided with a bleed valve H illustrated in FIG. 5 which operates reversely to that of the valve $B_1$ in that when it is moved to the left, it closes instead of opens the restriction. In this case, although the pressure sensitive element within the calibrator F is connected to the back pressure chamber 208, the bleed valve H is connected in the circuit containing the adjustable restrictor 125 or it may serve as the adjustable restrictor itself so that the back pressure chamber 126 will have a pressure that corresponds to that in the back pressure chamber 208 with the differential pressure gage 209 zeroed and the gage head engaging the reference master. In this case, the adjustable bleed is provided in the back pressure circuit containing the back pressure chamber 126 instead of bleeding the back pressure circuit that is connected to the gage head itself.

It will be apparent that the objects heretofore enumerated are accomplished in accordance with this invention and that there has been provided a very simple and accurate calibration system for fluid pressure control circuits of the type herein referred to. While the invention has been described in considerable detail, it is not to be limited to the particular embodiments shown and described and it is intended that all novel adaptations and modifications of the invention will be covered within the scope of the appended claims.

What is claimed is:

1. Gaging apparatus comprising a gaging circuit, including a pressure regulator, a gage head, a conduit connecting the pressure regulator to the gage head and having a restrictor creating a back pressure chamber between the restrictor and gage head, pressure sensing means having a connection to said back pressure chamber, calibrating means having a connection to the pressure sensing means, controlling means operatively connected to the calibrating means for adjustably setting the calibrating means and including a pressure responsive element having a connection to the conduit between the gage head and the restrictor so as to be subject to the pressure in the back pressure chamber, and a means for establishing and interrupting the last named connection to operate said calibrating means when the gage head is applied to a reference master.

2. In a pneumatic gaging circuit, a pneumatic supply conduit adapted for connection to a source of regulated air pressure, a gage head connected to the conduit to control circuit response in accordance with a gaged product characteristic, a restrictor provided in said conduit, a pressure sensing means connected to the conduit between the gage head and the restrictor, an adjustable bleed valve connected with the pressure sensing means and valve controlling means for automatically calibrating the pressure sensing means by adjusting the bleed valve and including a pressure responsive element having a connection to said conduit between the gage head and the restrictor, and means operable to temporarily establish communication through the last named connection to calibrate the pressure sensing means when the gage head is applied to a reference master.

3. In a pneumatic gaging circuit, a pneumatic supply conduit adapted for connection to a source of regulated air pressure, a gage head connected to the conduit to control circuit response in accordance with a gaged product characteristic, a restrictor provided in said conduit, a pressure sensing means connected to the conduit between the gage head and the restrictor, an adjustable bleed valve connected with the pressure sensing means and valve controlling means for automatically calibrating the pressure sensing means by adjusting the bleed valve and including a pressure responsive element having a connection to said conduit between the gage head and the restrictor, means operable to temporarily establish communication through the last named connection, and means for holding the setting of the bleed valve when said operable means is moved to interrupt communication through said last named connection.

4. In an air gage of the back pressure type having a gage head, a conduit connected to the gage head and adapted for connection to a source of regulated air pressure, a restriction in said conduit to provide a back pressure chamber in which the pressure varies in accordance with a characteristic of the product gaged by the gage head, a pressure sensing means having a connection to the back pressure chamber and operable in accordance with the gaged characteristic of the product gaged and normally having a predetermined finite response when the gage head is applied to a reference master, and calibrating means for said pressure sensing means comprising a moveable pressure responsive element, means for temporarily establishing communication between said element and back pressure chamber, and a compensating means operatively connected to the pressure sensing means and controllable by said element when the gage head is applied to the reference master and communication is established between the back pressure chamber and the said pressure responsive element to restore the response of the pressure sensing means to its predetermined finite value.

5. In an air gage of the back pressure type having a gage head, a conduit connected to the gage head and adapted for connection to a source of regulated air pressure, a restriction in said conduit to provide a back pressure chamber in which the pressure varies in accordance with a characteristic of the product gaged by the gage head, a pressure sensing means having a connection to the back pressure chamber and operable in accordance with the gaged characteristic of the product gaged and normally having a predetermined finite response when the gage head is applied to a reference master, and calibrating means for said pressure sensing means, comprising a moveable pressure responsive element, means for temporarily establishing communication between said element and back pressure chamber, and a compensating means operatively connected to the pressure sensing means and controllable by said element when the gage head is applied to the reference master and communication is established between the back pressure chamber and the said pressure responsive element to restore the response of the pressure sensing means to its predetermined finite value, and means for holding the setting of the compensating means when communication is interrupted between said element and said back pressure chamber.

6. In an air gage of the back pressure type, the structure of claim 5 wherein the compensating means is an air bleed valve having a connection to the back pressure chamber.

7. In a pneumatic control system of the type having a pressure differential sensing device which senses the difference in pressure between two pressures, one of which varies in amount according to the variable which is to be sensed, calibrating means for said pressure differential sensing device comprising an auxiliary bleed connection to one of said pressures, a bleed valve in said auxiliary connection having a moveable element controlling the flow through the bleed valve to vary one of said pressures, a pressure responsive means having a moveable portion actuating said valve, spring means opposing said pressure responsive means and holding means operable to prevent differences in said pressures from moving said valve, and means for releasing said holding means and simultaneously applying a pressure to said pressure responsive means to calibrate the pressure sensing means.

8. In a pneumatic control system, the structure of claim 7 wherein said pressure responsive means comprises a diaphragm chamber having a pair of opposing diaphragms of different effective size.

9. In a temperature gaging circuit, a pneumatic supply conduit adapted for connection to a source of regulated air pressure, a gage head connected to the conduit to control circuit response in accordance with a gaged product characteristic, a restrictor provided in said conduit, a pressure sensing means connected to the conduit between the gage head and the restrictor, an adjustable bleed valve connected to said conduit between the gage head and the restrictor, valve controlling means for automatically calibrating the pressure sensing means by adjustment of the bleed valve including a pressure responsive element having a connection to said conduit between the gage head and the restrictor, and a balancing spring opposing the action of the pressure responsive element, means operable to temporarily establish communication through the last named connection for automatic calibration when the gage head is applied to a reference master, and means for holding the setting of the bleed valve when said operable means is moved to interrupt communication through said last named connection.

10. In a pneumatic gaging circuit, a pneumatic supply conduit adapted for connection to a source of regulated air pressure, a gage head connected to the conduit to control circuit response in accordance with a gaged product characteristic, a restrictor provided in said conduit a pressure sensing means connected to the conduit between the gage head and the restrictor an adjustable bleed valve connected to said conduit between the gage head and the restrictor, valve controlling means for automatically calibrating the pressure sensing means by adjustment of the bleed valve including a pressure responsive element having a connection to said conduit between the gage head and the restrictor, and a balancing spring opposing the action of the pressure responsive element, means operable to temporarily establish communication through the last named connection for automatic calibration when the gage head is applied to a reference master, and means for holding the setting of the bleed valve when said operable means is moved to interrupt communication through said last named connection, means for relatively moving the reference master and the gage head to apply the master to the gage head and means for simultaneously releasing the setting of the bleed valve, applying the master to the gage head and placing the pressure responsive element in communication to said conduit between the gage head and the restrictor.

References Cited in the file of this patent
UNITED STATES PATENTS

| 2,831,257 | Aller | Apr. 22, 1958 |
| 2,971,366 | Tomkow | Feb. 14, 1961 |